United States Patent
Knight et al.

(10) Patent No.: US 7,934,341 B2
(45) Date of Patent: May 3, 2011

(54) INTERLOCKED WEATHERSTRIP APPEARANCE TREATMENT TO EXTERIOR MOULDING APPLICATIONS

(75) Inventors: Corey Knight, Commerce, MI (US); David Kreinbrink, Napoleon, OH (US)

(73) Assignee: Cooper-Standard Automotive Inc., Novi, MI (US)

( * ) Notice: Subject to any disclaimer, the term of this patent is extended or adjusted under 35 U.S.C. 154(b) by 469 days.

(21) Appl. No.: 11/997,275

(22) PCT Filed: Jul. 31, 2006

(86) PCT No.: PCT/US2006/029951
§ 371 (c)(1),
(2), (4) Date: May 29, 2008

(87) PCT Pub. No.: WO2007/016571
PCT Pub. Date: Feb. 8, 2007

(65) Prior Publication Data
US 2008/0302022 A1      Dec. 11, 2008

Related U.S. Application Data

(60) Provisional application No. 60/703,926, filed on Jul. 29, 2005.

(51) Int. Cl.
*E05F 11/38* (2006.01)
(52) U.S. Cl. .......... 49/377; 49/490.1
(58) Field of Classification Search .......... 49/374, 49/377, 495.1, 490.1, 492.1, 475.1
See application file for complete search history.

(56) References Cited

U.S. PATENT DOCUMENTS

| | | | | |
|---|---|---|---|---|
| 3,742,649 | A * | 7/1973 | Dochnahl | 49/441 |
| 4,949,507 | A * | 8/1990 | Vaughan | 49/482.1 |
| 5,743,047 | A * | 4/1998 | Bonne et al. | 49/490.1 |
| 5,846,631 | A | 12/1998 | Nowosiadly | |
| 6,070,363 | A * | 6/2000 | Vance | 49/377 |
| 6,141,854 | A * | 11/2000 | Mueller et al. | 29/450 |
| 6,260,254 | B1 * | 7/2001 | Mueller et al. | 29/450 |
| 6,282,840 | B1 * | 9/2001 | Vance | 49/377 |
| 6,409,251 | B1 | 6/2002 | Kaye et al. | |
| 6,681,526 | B2 * | 1/2004 | Mueller et al. | 49/440 |
| 6,742,304 | B1 * | 6/2004 | Mueller et al. | 49/377 |
| 7,171,785 | B1 * | 2/2007 | Kelly et al. | 49/377 |
| 7,484,287 | B2 * | 2/2009 | Tamura | 29/451 |
| 7,565,771 | B2 * | 7/2009 | Brocke | 49/377 |
| 2001/0025454 | A1 | 10/2001 | Cretin | |
| 2003/0075949 | A1 | 4/2003 | Kanie et al. | |
| 2005/0235569 | A1 * | 10/2005 | Shumulinskiy | 49/377 |

FOREIGN PATENT DOCUMENTS

| | | |
|---|---|---|
| DE | 33 07 021 A1 | 9/1984 |
| DE | 94 01 569 U1 | 2/1995 |
| EP | 0 792 766 A1 | 9/1997 |

OTHER PUBLICATIONS

EP 06 78 9119 Supplementary European Search Report, mailed Nov. 10, 2010.

* cited by examiner

*Primary Examiner* — Jerry Redman
(74) *Attorney, Agent, or Firm* — Fay Sharpe LLP

(57) ABSTRACT

A weatherstrip is provided in which a first component provides for functional sealing. A second component, formed of a different material, is interlocked to the first component. The securing structure is not visible from the exterior and allows the second component to improve the aesthetics, be color-matched with the vehicle, or have an altered geometry as needed for the particular vehicle component.

16 Claims, 2 Drawing Sheets

INTERLOCKED WEATHERSTRIP APPEARANCE TREATMENT TO EXTERIOR MOULDING APPLICATIONS

This application claims priority from U.S. provisional application Ser. No. 60/703,926, filed Jul. 29, 2005, the disclosure of which is incorporated herein by reference.

BACKGROUND OF THE INVENTION

This application is directed to a seal strip, weatherseal, or weatherstrip of the type that is typically mounted to a vehicle flange. For example, a U-shaped portion of a weatherstrip body is mounted on a supporting vehicle flange. Such strips are commonly used as outer belt structures along a lower edge of a window opening in a vehicle door to provide a transition between the door body and a window, and provide an effective seal from the weather or environment. The seal strip also finds application in related environments where an ornamental or show surface is desired in combination with the functional sealing aspect.

The outer belt body typically includes a carrier or core that forms a generally rigid substrate for an extrusion material such as an elastomer (EPDM or the like), over at least selected portions of the core. For example, the core may be a light weight metal or other rigid material that provides the desired strength characteristics. The extruded material includes gripping fins that engage the associated flange of the automotive vehicle and thereby secure the weathestrip in place. In addition, seal lips extend outwardly from the extrusion and preferably include a low-friction material such as a flock or other low-friction material applied on selected regions. As is well-known, the low-friction material is disposed for engagement with the associated vehicle window as it is selectively raised and lowered relative to the door.

It is important to improve the aesthetics of an outer shoulder or exterior surface of the outer belt. For example, such a show surface may be a separately molded or extruded part, typically referred to as a trim strip, or a decorative strip, that has an outer surface that is more closely controlled during manufacture for aesthetic purposes. This is, the underlying substrate of the core and extruded EPDM is somewhat limited in its show appearance and thus, automotive manufacturers desire a more pleasing appearance along the show surface for these types of weatherstrips.

In addition, preferably the exterior appearance of the weatherstrip has a narrow width for packaging. This has previously been unattainable at a reasonable cost. Either the weatherstrip undergoes substantial manufacturing operations or prior, known arrangements have used fasteners or clips of a complex arrangement to achieve this objective.

It is further desirable to limit the manufacturing steps and thus reduce the overall costs of producing the weatherstrip. For example, under one scenario complex fastening shapes must be formed in the separate components in order to join the individual components together. Thus, even if the individual components are extruded, heretofore, expensive post-forming operations have been undertaken in order to secure the individual components. Thus, one effort to reduce overall costs reduces the number of post-forming operations.

In order to maximize use of the seal and show surface, tt is also helpful if the show component can be applied to a wide array of underlying weatherseal components or underlying configurations of the weatherseal substrate. For example, it would be helpful to have the show surface connect directly to the core, or alternatively to join the show surface to the EPDM, TPV disposed on the core, or secure the show surface at one location to the core itself and at another region to the extruded material on the core.

One skilled in the art will also appreciate that these features should also be equally applicable to weatherstrip belts, glass runs, appliqués, belt line seals, etc. That is, wherever functional sealing is required in conjunction with a desired exterior appearance having improved color, texture, or capable of a wide variety of geometrical shapes, the need exists for an improved weatherstrip.

It is further desired that the narrow show surface be easily attached to the underlying component, particularly without showing any of the interlocking features joining the individual components in the final assembly.

Thus, a need exists for a mechanically interlocked outer-belt application that uses a gripper profile to attach an exterior show surface to an extrusion. Preferably, the design would be one that provides for a narrow packaging space requirement and preferably the attachment features will not be visible from the exterior of the assembly.

SUMMARY OF THE INVENTION

A weatherstrip is adapted for receipt on an associated vehicle. The weatherstrip includes a first, elongated component having a shoulder along a first end thereof, and longitudinally spaced slots spaced from the edge. A second component, or show surface, is snap-fit to the first component. The second component includes an extending portion that engages the shoulder of the first component and precludes relative movement in a direction generally perpendicular to the elongated axes of the first and second components. Snap-fit fingers are dimensioned in spaced relation along the second component for receipt in the slots of the first component.

The weatherstrip is adhered to the associated vehicle via a U-shaped cavity which selectively engages an associated flange of the vehicle. Gripping fingers extend into the cavity to secure the weatherstrip to the flange, and at least one sealing fin extends outwardly for sliding engagement with an associated window of a vehicle.

In one embodiment, the first component includes a rigid carrier. An elastomeric material may be extruded over at least some portion of the rigid carrier. The slots extend through the rigid carrier in this embodiment to allow the second component to be snap-fit thereto.

The first component preferably includes an extruded EPDM.

The second component is preferably a molded plastic providing an aesthetically pleasing show surface.

A primary advantage associated with this weatherstrip assembly is the ability to securely attach the show component to the underlying weatherstrip component. Another advantage resides in the ability to alter the geometry of the show component without impacting the functionality of the weatherstrip.

Still another advantage is found in the ease with which the first and second components may be secured together.

Still other features and advantages of the invention will become apparent to those skilled in the art from reading and understanding the following detailed description.

DETAILED DESCRIPTION OF THE INVENTION

Figure 1:
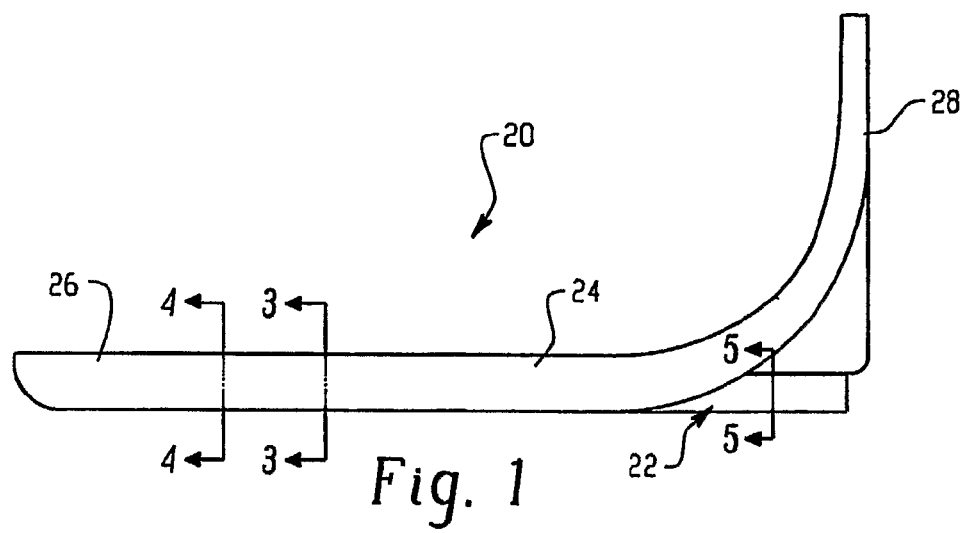
FIG. 1 is a plan view of a preferred weatherstrip.

FIG. 1 shows a weatherstrip assembly 20 including a first component or underlying substrate portion 22 and a second component or show surface portion 24. The weatherstrip assembly may be employed at various locations on a vehicle and, for example in the illustrated embodiment shown here, the weatherstrip assembly is a rear door outer belt. The assembly includes an elongated first portion 26 that extends along the belt line of the rear door and an upturned portion 28 that extends in a generally vertical direction therefrom.

Figure 2:
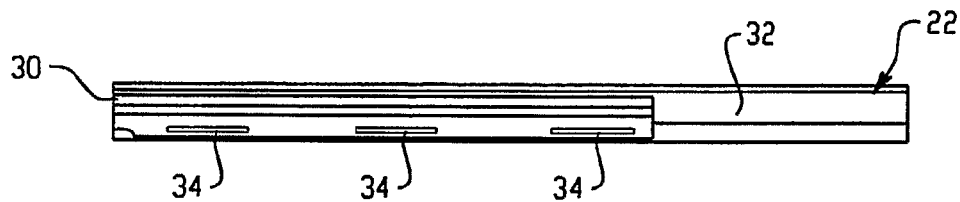
FIG. 2 is a plan view of a first component of the weatherstrip of FIG. 1.
Figure 3:
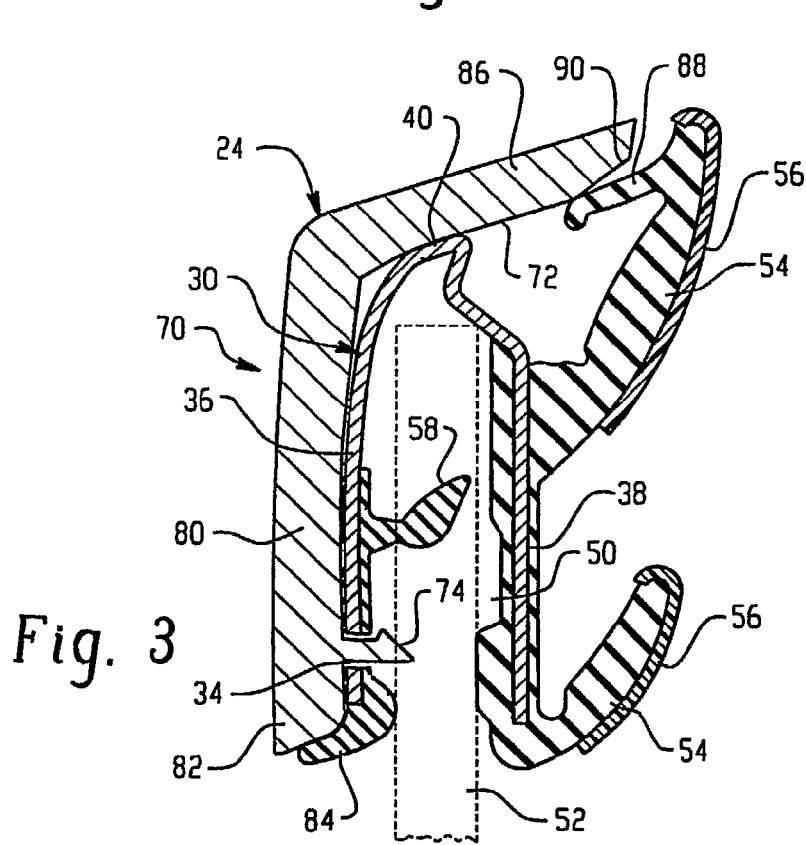
FIG. 3 is a cross-sectional view taken generally along the lines 3-3 of FIG. 1.

With continued reference to FIG. 1 and additional reference to FIG. 2, the first component of the assembly is preferably an extruded structure that includes a rigid core 30. It may also include an extruded portion 32, such as an EPDM received over at least portions of the carrier or core. This is more apparent from additional reference to FIGS. 3-5 which illustrate cross-sections through the longitudinal portion 26 at different locations along the length thereof. As shown in FIG. 2, the core includes spaced through holes or slots 34 which form a portion of the fastening means for securing the first and second components 22, 24 together. More particularly, the core 30 may be a metal, such as lightweight aluminum, or a rigid plastic, that has a generally U-shaped configuration defined by generally parallel legs 36, 38 that are joined together by interconnecting wall 40 at one end thereof. Thus, as best seen in FIG. 3, the three legs form a generally U-shaped body having an inner cavity 50 dimensioned to receive associated flange 52 of the vehicle (not shown). Preferably, the first leg 36 includes the elongated slots 34 (FIGS. 2 and 3), while the second leg 38 does not include such openings.

As is evident from FIG. 3, the first leg extends over the first or outer surface of the vehicle flange 52, while the second leg 38 is disposed along an inward surface facing toward the interior of the vehicle. Seal lips 54 extend from the second leg 38 and preferably include a low friction coating 56 that is provided along those areas adapted for engagement with the associated vehicle window (not shown). For example, a low-friction flock or low-friction plastic is preferably co-extruded with the seal lips 54, such as an EPDM, and likewise co-extruded over the core 30. In addition, at least one gripping finger 58 extends inwardly into the cavity 50 for engagement with the flange 52. Here, the gripping finger 58 extends from the first leg and secures the weatherstrip from inadvertent removal from the vehicle flange.

The show surface component 24 in the preferred embodiment is preferably a molded plastic. The show component can be color-matched with the vehicle, may include a textured surface for a pleasing aesthetic appearance, or have a high-gloss exterior surface 70 as desired for certain automotive applications. Extending from a rear surface 72 of the show component is a first or engagement leg 74, having a tapered shoulder 76 that is dimensioned for snap-fit receipt through the spaced openings or slots 34 of the first leg. The shoulder prevents inadvertent removal of the show surface from the underlying first component once the shoulder has been inserted through the slot.

Figure 4:
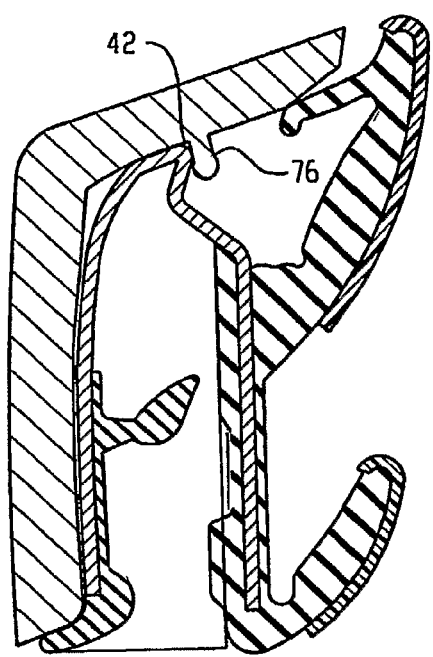
FIG. 4 is a cross-sectional view taken generally along the lines 4-4 of FIG. 1.

In addition to the engagement leg 74, the second component also includes an inwardly extending leg 76, located and dimensioned for abutting engagement with shoulder 42 of the interconnecting leg 40. This arrangement precludes relative movement of the first and second components in a direction generally perpendicular to the elongated axes of the first and the second components. The leg 76 may be intermittently or alternately located along the show component between the slots 34. In other words, a comparison of FIGS. 3 and 4 illustrate that at a longitudinal location along the weatherstrip where a retaining leg 74 is received through a slot 34, there is no leg 76 at this longitudinal location. Likewise, wherever a leg 76 is provided, there is no corresponding retaining leg 74 at this longitudinal location.

This arrangement of alternating, intermittent fastening legs 74, 76 provides for ease of assembly of the show surface component 24 to the underlying first component 22 of the weatherstrip assembly 20. The fastening arrangement accurately locates the show surface on the underlying first component and provides a cam lock arrangement. In addition, the first leg portion 80 of the show surface overlies the first leg 36. A terminal edge 82 engages seal lip 84 formed on a lower edge of the first leg of the first component. Likewise, second leg 86 of the show component is sufficiently elongated to overlie the interconnecting leg 40, and also preferably engage with a reverse leg portion 88 of the upper seal lip 54. Further, tapered surface 90 assures that the leg 88 slides beneath the second leg portion 86 of the show surface component.

Figure 5:
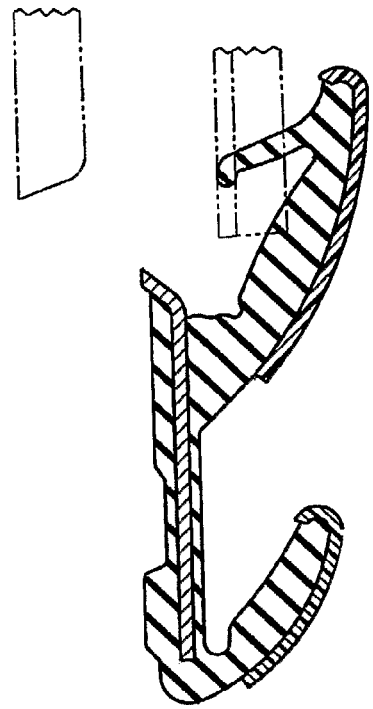
FIG. 5 is a cross-sectional view taken generally along the lines 5-5 of FIG. 1.

As particularly illustrated in FIG. 5, the underlying first component does not include the first leg 36 at this longitudinal location. Only second leg 38 is provided in this region of the weatherstrip. As such, the show surface turns the corner into the vertical portion 28. Thus, along the vertical portion there is no underlying first component required.

Figure 6:
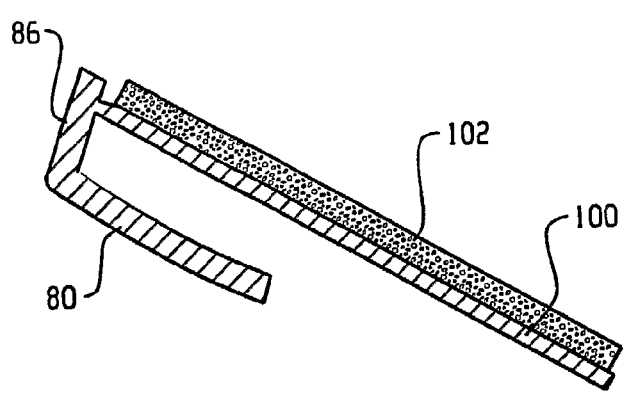
FIG. 6 is a cross-sectional view taken generally along the lines 6-6 of FIG. 1.

This altering conformation of the first component along the length thereof is further evidenced in FIG. 6 which shows that in this corner region, the show component includes a second leg portion 100. Preferably, second leg portion 100 is integrally molded with the remainder of the show component 70, namely, first leg portion 80 and second leg portion 86. The show component may also include an underlying foam component 102 on an interior surface of the leg 100.

As described above, the first component is preferably an aluminum carrier or core that is coextruded with EPDM portions. The second component is preferably an ASA molded show component. It will be appreciated, however, that this invention is not particularly limited to these materials of construction. For example, the extrusion can be a TPV, or other supported or unsupported (i.e., no rigid core or carrier) material. Likewise, the show surface component can be formed from a wide variety of plastics.

Still further, although described as a weatherstrip outer belt arrangement, the features of this invention may be useful in other applications such as glass runs, appliqués, lift glass beltline seals, etc. Generally, those applications that require functional sealing (as provided by the first component) and at least one of a multitude of exterior appearance, color, texture, or geometry options (provided by the second component) can find use of the present invention.

The invention has been described with reference to the preferred embodiment. Obviously, modifications and alterations will occur to others upon a reading and understanding of this specification. The invention is intended to include all such modifications and alterations insofar as they come within the scope of the appended claims or the equivalents thereof.

Having thus described the invention, it is now claimed:

1. A weatherstrip adapted for receipt on a vehicle, the weatherstrip comprising:
    an elongated first component having a shoulder along an edge thereof, and longitudinally spaced slots spaced from the edge; and
    an elongated second component snap-fit to the first component formed from a different material than the first component, the second component including axially spaced extending portions that engages the shoulder of the first component and precludes relative movement of the first and second components in a direction generally perpendicular to elongated axes of the first and the second components, and a series of snap-fit fingers dimensioned and spaced apart for receipt in the spaced slots of the first component, the snap-fit fingers and the extending portions being disposed in axially alternate locations.

2. The weatherstrip of claim 1 further comprising means for securing the weatherstrip to the vehicle.

3. The weatherstrip of claim 2 wherein the securing means includes a generally U-shaped cavty dimensioned for receipt over a vehicle flange.

4. The weatherstrip of claim 3 wherein the securing means includes at least one gripping finger extending into the U-shaped cavity for selectively engaging the flange.

5. The weatherstrip of claim 1 wherein the first component includes a sealing fin extending outwardly therefrom for sliding engagement with a window of the vehicle.

6. The weatherstrip of claim 1 wherein the first component includes a rigid carrier over at least a portion of which is received an elastomeric material.

7. The weatherstrip of claim 6 wherein the elastomeric material is extruded over the rigid carrier.

8. The weatherstrip of claim 6 wherein the rigid carrier is a metal.

9. The weatherstrip of claim 1 wherein the first component is a rigid carrier.

10. The weatherstrip of claim 1 wherein the extending portion of the second component includes a leg portion received in abutting engagement with the shoulder.

11. The weatherstrip of claim 10 wherein the first component is absent along the second leg portion.

12. The weatherstrip of claim 1 wherein the second component includes a second leg extending outwardly from a corner portion at an angle relative to a remainder of the second component.

13. The weatherstrip of claim 12 wherein the second leg of the second component includes first and second leg portions disposed in spaced relation.

14. The weatherstrip of claim 13 wherein the second leg portion is integrally formed with the first leg portion.

15. The weatherstrip of claim 13 wherein the second leg portion is integrally molded with the first leg portion.

16. The weatherstrip of claim 12 further comprising a foam component along a surface that faces the vehicle.

* * * * *